(12) United States Patent
Chen et al.

(10) Patent No.: US 11,467,244 B2
(45) Date of Patent: Oct. 11, 2022

(54) DEVICE AND METHOD FOR ESTIMATING DIRECTION OF ARRIVAL OF SOUND FROM A PLURALITY OF SOUND SOURCES

(71) Applicant: Huawei Technologies Co., Ltd., Shenzhen (CN)

(72) Inventors: Kainan Chen, Munich (DE); Wenyu Jin, Munich (DE)

(73) Assignee: Huawei Technologies Co., Ltd., Shenzhen (CN)

(*) Notice: Subject to any disclaimer, the term of this patent is extended or adjusted under 35 U.S.C. 154(b) by 54 days.

(21) Appl. No.: 16/858,208

(22) Filed: Apr. 24, 2020

(65) Prior Publication Data

US 2020/0249308 A1 Aug. 6, 2020

Related U.S. Application Data

(63) Continuation of application No. PCT/EP2017/077529, filed on Oct. 26, 2017.

(51) Int. Cl.
*G01S 3/80* (2006.01)
*G01S 3/808* (2006.01)

(52) U.S. Cl.
CPC .......... *G01S 3/8006* (2013.01); *G01S 3/8083* (2013.01)

(58) Field of Classification Search
CPC .............................. G01S 3/8006; G01S 3/8083
See application file for complete search history.

(56) References Cited

U.S. PATENT DOCUMENTS 9,229,086 B2 * 1/2016 Shuang ................ G01S 3/8034
2010/0152600 A1 * 6/2010 Droitcour ............ A61B 5/1114
600/534

FOREIGN PATENT DOCUMENTS

EP 2530484 A1 12/2012
WO 2017108097 A1 6/2017

OTHER PUBLICATIONS

Yinghua Han, Jinkuan Wang, and Xin Song, Generalized Esprit Algorithm Based on Schur-Hadamard Product for DOA Estimation of General-Rank Signals, 2008, International Journal of Information and Systems Sciences, vol. 4, No. 3, pp. 362-373 (Year: 2008).*

(Continued)

*Primary Examiner* — Isam A Alsomiri
*Assistant Examiner* — Abdallah Abulaban
(74) *Attorney, Agent, or Firm* — Leydig, Voit & Mayer, Ltd.

(57) ABSTRACT

A device estimates direction of arrival (DOA) of sound from $Q$ sound sources received by P microphones, wherein $P \geq Q > 1$. The device is configured to transform the output signals of the microphones into the frequency domain and compute a covariance matrix for each of N frequency bins in a range of frequencies of the sound. Further, the device is configured to calculate an adapted covariance matrix from each of the covariance matrices for wide-band merging, calculate an accumulated covariance matrix from the N adapted covariance matrices, and estimate the DOA for each of the sound sources based on the accumulated covariance matrix. In order to calculate an adapted covariance matrix from a covariance matrix, the device is configured to spectrally decompose the covariance matrix and obtain a plurality of eigenvectors, rotate each obtained eigenvector, and construct each rotated eigenvector back to the shape of the covariance matrix.

10 Claims, 4 Drawing Sheets

(56) References Cited

OTHER PUBLICATIONS

Roy et al., "ESPRIT—Estimation of Signal Parameters Via Rotational Invariance Techniques," IEEE Transactions on Acoustics Speech, and Signal Processing, vol. 37, No. 7, XP000037318, pp. 984-995, Institute of Electrical and Electronics Engineers, New York, New York (Jul. 1989).

Schmidt, "Multiple Emitter Location and Signal Parameter Estimation," IEEE Transactions on Antennas and Propagation, vol. AP-34, No. 3, pp. 276-280, Institute of Electrical and Electronics Engineers, New York, New York (Mar. 1986).

Ottersten et al., "Direction-of-Arrival Estimation for Wide-Band Signals Using the ESPRIT Algorithm," IEEE Transactions on Acoustics, Speech, and Signal Processing, vol. 38, No. 2, pp. 317-327, Institute of Electrical and Electronics Engineers, New York, New York (Feb. 1990).

Wang et al., "Coherent Signal-Subspace Processing for the Detection and Estimation of Angles of Arrival of Multiple Wide-Band Sources," IEEE Transactions on Acoustics, Speech, and Signal Processing, vol. 33, No. 4, pp. 823-831, Institute of Electrical and Electronics Engineers, New York, New York (Aug. 1985).

Xiao et al., "An Expectation-Maximization Eigenvector Clustering Approach to Direction of Arrival Estimation of Multiple Speech Sources," 2016 IEEE International Conference on Acoustics, Speech and Signal Processing, Lujiazui, Shanghai, China, pp. 6330-6334, Institute of Electrical and Electronics Engineers, New York, New York (Mar. 20-25, 2016).

Ng et al., "On the Implementation of Particle Filters for DOA Tracking," 2001 IEEE International Conference on Acoustics, Speech and Signal Processing, Salt Lake City, pp. 2821-2824, Institute of Electrical and Electronics Engineers, New York, New York (May 7-11, 2001).

\* cited by examiner

DEVICE AND METHOD FOR ESTIMATING DIRECTION OF ARRIVAL OF SOUND FROM A PLURALITY OF SOUND SOURCES

CROSS-REFERENCE TO RELATED APPLICATIONS

This application is a continuation of International Application No. PCT/EP2017/077529, filed on Oct. 26, 2017, the disclosure of which is hereby incorporated by reference in its entirety.

FIELD

The disclosure relates to a device and to a corresponding method for estimating direction of arrival (DOA) from a plurality of $Q > 1$ sound sources.

BACKGROUND

Most narrow-band multichannel source localization algorithms are designed to estimate DOAs in the time domain for narrow-band signals, or for each frequency bin in a discrete Fourier transform (DFT) domain for wide-band signals. Sound sources emitting wide-band sound, such as speech, are rather common and the typical scenario for sound source localization. Microphone units, which pick up the wide-band sound, output signals that are usually transformed into the time frequency domain. Then, a narrow-band DOA estimation algorithm is applied and repeated, in order to obtain a DOA from each of a plurality of frequency bins (narrow-band) in a range of frequencies of the sound. After all narrow-band DOAs are obtained, post-processing (e.g. a histogram) is applied, in order to estimate the final DOAs for the time frame.

For instance, the ESPRIT algorithm is such a narrow-band DOA estimation algorithm. Disadvantageously, the repeating process of a narrow-band DOA estimation algorithm utilizes only narrow-band signal statistics, and the post-processing does not directly depend on the signal statistics. Thus, the ESPRIT algorithm, like any other narrow-band DOA estimation algorithm, is not robust. Furthermore, the computational complexity of repeating such narrow-band DOA estimation algorithms is high, and the overall estimation process is slow.

SUMMARY

In view of the above-mentioned disadvantages, the disclosure provides improvements to the conventional sound source localization algorithms, particularly narrow-band DOA estimation algorithms like the ESPRIT algorithm. For example, the disclosure provides a device and a method that enable a sound source localization, i.e. the estimation of the DOA from a plurality of sound sources, with improved robustness. In addition, device and method obtain the estimation of the DOA faster and with less computational complexity.

The disclosure provides a device and a method, which implement an algorithm that is based on the ESPRIT algorithm. However, in contrast to the ESPRIT algorithm, the device and method estimate adapted estimated signal subspace for each of the sound sources from all frequency bins together, and then obtain the DOAs directly from transforming these adapted signal subspace.

The present disclosure provides a device and a corresponding method for estimating Direction of Arrival (DOA) from a plurality of $Q > 1$ sound sources. The sound from the sound sources is received by a plurality of P ($P \geq Q$) microphone units. In particular, an embodiment of the device and method of the disclosure performs a processing on output signals of the P microphone units, and particularly on covariance matrices calculated, from the output signals, for different frequency bins in a range of frequencies of the sound.

A first aspect of the disclosure provides a device for estimating DOA of sound from $Q$ sound sources received by P microphone units, where $P \geq Q > 1$. The device is configured to: transform the output signals of the P microphone units into the frequency domain and compute a covariance matrix for each of a plurality of N frequency bins in a range of frequencies of the sound, calculate an adapted covariance matrix from each of the N covariance matrices for wide-band merging, calculate an accumulated covariance matrix from the N adapted covariance matrices, and estimate the DOA for each of the $Q$ sound sources based on the accumulated covariance matrix. In order to calculate an adapted covariance matrix from a covariance matrix, the device is configured to spectrally decompose the covariance matrix and obtain a plurality of eigenvectors, rotate each obtained eigenvector, and construct each rotated eigenvector back to the shape of the covariance matrix to obtain the adapted covariance matrix.

The device thus implements an algorithm, which accumulates narrow-band signal statistics in the eigenvalue domain to wide-band, and then estimates the DOA results for the $Q$ sound sources in a time frame. Accordingly, there are more signal statistics that indicate the spatial localization of the sound sources, when for instance compared to the ESPRIT algorithm. As a consequence, the device can estimate the DOAs faster and with less computational complexity. Additionally, the algorithm implemented by the device is more robust.

In an implementation form of the first aspect, in order to obtain the plurality of eigenvectors, the device is configured to select the $Q$ eigenvectors of the covariance matrix related to the $Q$ highest eigenvalues.

It is assumed that the $Q$ sound sources are point sources, which correspond to the eigenvectors with the highest eigenvalues. Thus, the $Q$ highest eigenvalues and eigenvectors can be chosen, and the rest of the eigenvalues and eigenvectors can be removed (disregarded). As a consequence, the computational complexity of the algorithm implemented by the device can be reduced, without sacrificing on the accuracy of the DOA estimation.

In a further implementation form of the first aspect, the device is configured to rotate the eigenvector by Hadamard powering of the corresponding frequency to the complex-value eigenvector.

In this effective way, the eigenvectors are frequency-independent for all frequency bins.

In a further implementation form of the first aspect, in order to construct a rotated eigenvector back to the shape of the covariance matrix, the device is configured to reconstruct the covariance matrix by multiplying the rotated eigenvector, a diagonal matrix of size Q*Q, and the inverse of the rotated eigenvector.

Thereby, the phase differences are uniformed for all frequency bins, so that the estimation can be further performed in wide-band, namely by calculating the accumulated covariance matrix from the adapted covariance matrices.

In a further implementation form of the first aspect, in order to rotate each obtained eigenvector and construct each rotated eigenvector back to the shape of the covariance matrix, the device is configured to perform, over all frequency bins, an accumulation iteration process based on the eigenvectors and their related eigenvalues, or a summing process, or an averaging process based on the reconstructed covariance matrices.

This implementation form can ensure in a case where the frequencies are high, that a floating-point computational unit of the device can run accurately.

In a further implementation form of the first aspect, in order to calculate the accumulated covariance matrix, the device is configured to weigh each adapted covariance matrix.

Thus, an accumulated covariance matrix is obtained, based on which the DOA estimation can be carried out further in wide-band.

In a further implementation form of the first aspect, the device is configured to weigh an adapted covariance matrix based on the mean square of the frequency-domain transformed output signals of the microphone units for the same frequency bin.

In a further implementation form of the first aspect, in order to calculate the accumulated covariance matrix, the device is configured to accumulate adapted covariance matrices over a plurality of time frames.

This further improves the robustness of the algorithm implemented by the device, in particular for short-time stationary sound source localization.

In a further implementation form of the first aspect, in order to estimate the DOA for each of the $Q$ sound sources, the device is configured to estimate, based on the accumulated covariance matrix, accordingly adapted phase difference values, each of the adapted phase difference values being related to a phase difference between two microphone units, and estimate the DOAs based on the adapted phase difference values.

Accordingly, the DOA estimation can be performed in wide-band, frequency independent, and is thus more robust.

A second aspect of the disclosure provides a method of estimating DOA of sound from $Q \geq 1$ sound sources received by P microphone units, where $P \geq Q > 1$. The method includes: transforming the output signals of the P microphone units into the frequency domain and computing a covariance matrix for each of a plurality of N frequency bins in a range of frequencies of the sound, calculating an adapted covariance matrix from each of the N covariance matrices for wide-band merging, calculating an accumulated covariance matrix from the N adapted covariance matrices, and estimating the DOA for each of the $Q$ sound sources based on the accumulated covariance matrix. Calculating the adapted covariance matrix from a covariance matrix includes spectrally decomposing the covariance matrix and obtaining a plurality of eigenvectors, rotating each obtained eigenvector, and constructing each rotated eigenvector back to the shape of the covariance matrix to obtain the adapted covariance matrix.

In an implementation form of the second aspect, in order to obtain the plurality of eigenvectors, the method includes selecting the $Q$ eigenvectors of the covariance matrix related to the $Q$ highest eigenvalues.

In a further implementation form of the second aspect, the method includes rotating the eigenvector by Hadamard powering of the corresponding frequency to the complex-value eigenvector.

In a further implementation form of the second aspect, in order to construct a rotated eigenvector back to the shape of the covariance matrix, the method includes reconstructing the covariance matrix by multiplying the rotated eigenvector, a diagonal matrix of size Q*Q, and the inverse of the rotated eigenvector.

In a further implementation form of the second aspect, in order to rotate each obtained eigenvector and construct each rotated eigenvector back to the shape of the covariance matrix, the method includes performing, over all frequency bins, an accumulation iteration process based on the eigenvectors and their related eigenvalues, or a summing process, or an averaging process based on the reconstructed covariance matrices.

In a further implementation form of the second aspect, in order to calculate the accumulated covariance matrix, the method includes weighing each adapted covariance matrix.

In a further implementation form of the second aspect, the method includes weighing an adapted covariance matrix based on the mean square of the frequency-domain transformed output signals of the microphone units for the same frequency bin.

In a further implementation form of the second aspect, in order to calculate the accumulated covariance matrix, the method includes accumulating adapted covariance matrices over a plurality of time frames.

In a further implementation form of the second aspect, in order to estimate the DOA for each of the $Q$ sound sources, the method includes estimating, based on the accumulated covariance matrix, accordingly adapted phase difference values, each of the adapted phase difference values being related to a phase difference between two microphone units, and estimating the DOAs based on the adapted phase difference values.

The method of the second aspect and its implementation forms achieve the same advantages as the device of the first aspect and its respective implementation forms.

A third aspect of the disclosure provides a computer program product comprising a program code for controlling a device according to the first aspect or any of its implementation forms or for performing, when running on a computer, the method according to the second aspect or any of its implementation forms.

With the computer program product of the third aspect, the advantages and effects of the device of the first aspect and the method of the second aspect, respectively, can be achieved.

It has to be noted that all devices, elements, units, and means described in the present application could be implemented in the software or hardware elements or any kind of combination thereof. All steps which are performed by the various entities described in the present application as well as the functionalities described to be performed by the various entities are intended to mean that the respective entity is adapted to or configured to perform the respective steps and functionalities. Even if, in the following description of exemplary embodiments, a specific functionality or step to be performed by external entities is not reflected in the description of a specific detailed element of that entity which performs that specific step or functionality, it should be clear for a skilled person that these methods and functionalities can be implemented in respective software or hardware elements, or any kind of combination thereof.

BRIEF DESCRIPTION OF THE DRAWINGS

The above described aspects and implementation forms of the disclosure will be explained in the following description of exemplary embodiments in relation to the enclosed drawings, in which.

DETAILED DESCRIPTION OF THE EMBODIMENTS

Figure 1:
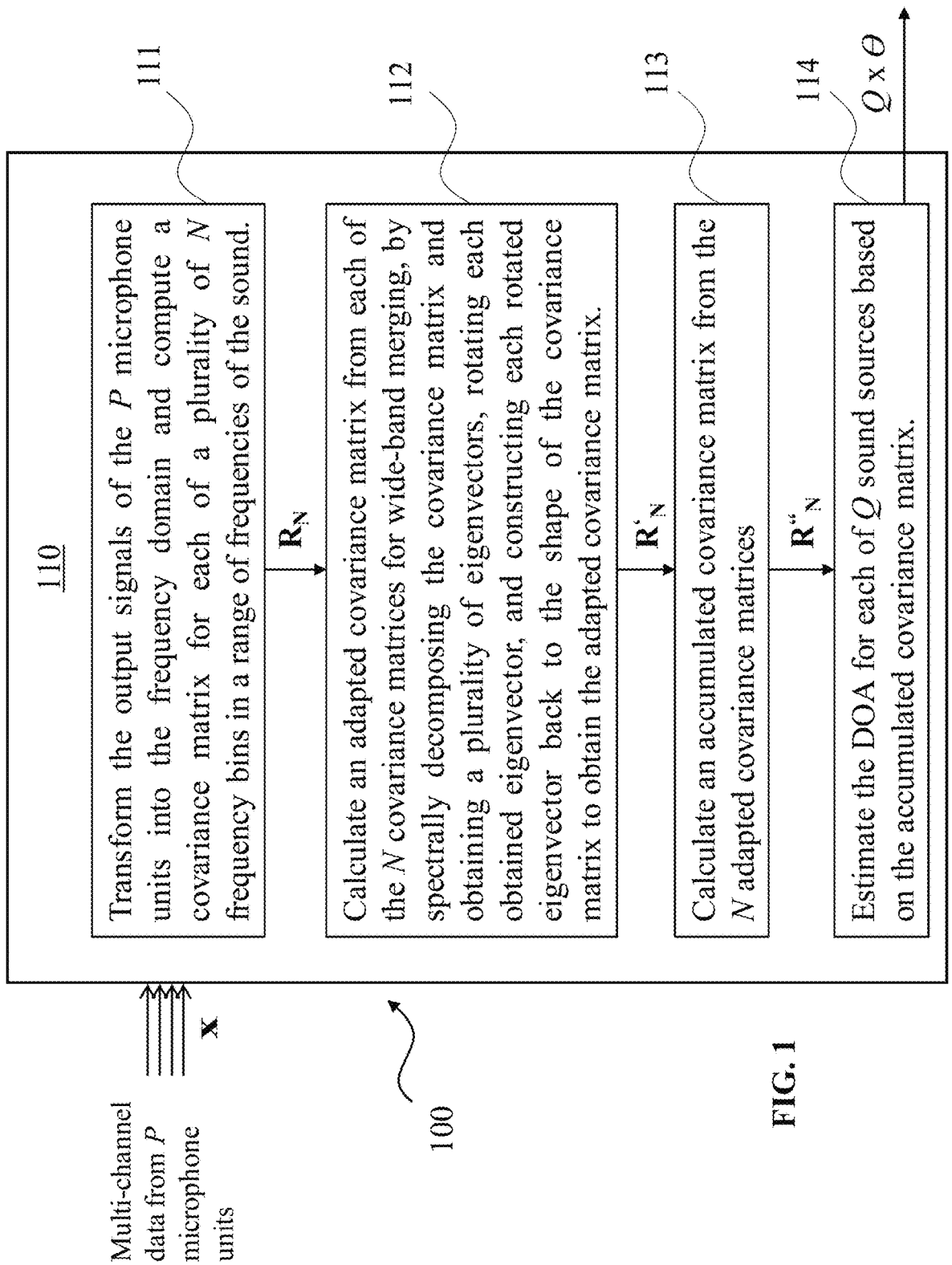
FIG. 1 shows a device according to an embodiment of the disclosure, which implements a method according to an embodiment of the disclosure.

FIG. 1 shows a device 100 according to an embodiment of the disclosure. The device 100 is configured to estimate DOA of sound from multiple sound sources.

Figure 2:
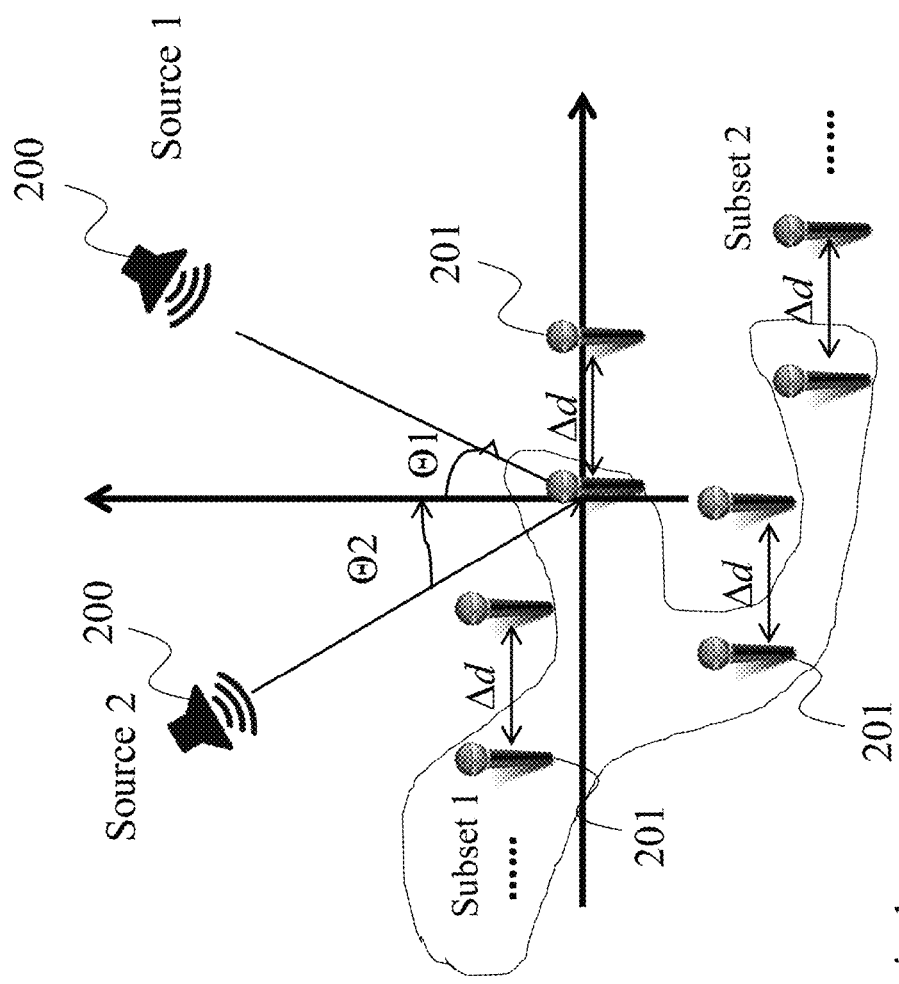
FIG. 2 shows an overview of the sound sources and the microphone units.

In particular, the device 100 is designed for multichannel sound source localization in a 2D plane, where the sound is picked up by a plurality of microphone units, for instance, of a microphone array. In this respect, FIG. 2 shows an overview of a typical arrangement of a plurality of sound sources 200 and a plurality of microphone units 201 for picking up the sound of the sound sources 201. The geometry requirement in the exemplary embodiment is that the microphone units 201 form pairs, in which the microphone units 201 have identical sensitivity patterns, and are translationally separated by a known and constant displacement vector $\Delta d$. Each pair is formed by two microphone units 201. In FIG. 2, the number of microphone units 201 is twice the number of pairs. However, it is also possible that a microphone unit 201 belongs to two pairs. That is, for instance, three microphone units 201 may be arranged as a uniform linear array that every $\Delta d$ to form two pairs. The same is possible with each uneven number of microphone units 201. The device 100 is preferably configured to operate in a determined scenario, in which the number of pairs of microphone units 201 is more than the number of sound sources 200.

It is noted in the end that there are several special cases that fit the geometry requirements of the microphone units 201, such as 2-microphone array, uniform linear array, and some kind of circular arrays. Today tablets, mobile phones, smart TV, smart home speakers, AR/VR, and teleconference devices are using microphone arrays that fit this geometry condition.

In particular, the device 100 shown in FIG. 1 is configured to estimate the DOA of sound from $Q$ sound sources 200 received by P microphone units 201, where $P \geq Q > 1$. The device 100 may include the microphone units 201, but is preferably a processing device 100, which receives and processes the output signals from the microphone units 201. To this end, the device 100 is configured to implement a method 110 according to an embodiment of the disclosure, which is described in the following.

By implementing the method 110, the device 100 is configured to transform 111 the output signals of the P microphone units 201 into the frequency domain and compute a covariance matrix for each of a plurality of N frequency bins in a range of frequencies of the sound. $N \geq 1$ is a natural number. That is, the device 110 is configured to compute N covariance matrices.

Further, the device 100 is configured to calculate 112 an adapted covariance matrix from each of the N covariance matrices for wide-band merging, to calculate 113 an accumulated covariance matrix from the N adapted covariance matrices (by accumulating the N adapted covariance matrices), and to estimate 114 the DOA for each of the $Q$ sound sources based on the accumulated covariance matrix.

The device 100 is configured, in order to calculate an adapted covariance matrix (i.e. any one of the N adapted covariance matrices) from a covariance matrix (i.e. from any one of the N covariance matrices), to spectrally decompose the covariance matrix and obtain a plurality of eigenvectors (i.e. carry out an eigenvalue decomposition), rotate each obtained eigenvector (for the purpose of unifying the eigenvectors), and construct each rotated eigenvector back to the shape of the covariance matrix to obtain the adapted covariance matrix.

The disclosure, implemented by device 100 and method 110, and the ESPRIT algorithm both firstly transform the output signals of the microphone units 201 into an N point frequency domain by DFT. The ESPRIT algorithm then estimates phase differences $\Delta \varphi_n$ between the microphone units 201 of each pair for each sound source from the $n_{th}$ frequency bin. The device 100 and method 110, however, estimate uniformed phase differences $\Delta \varphi'$ for each sound source 200 from all the frequency bins together, so that DOAs can be directly obtained by transforming the uniformed phase differences.

Figure 3:
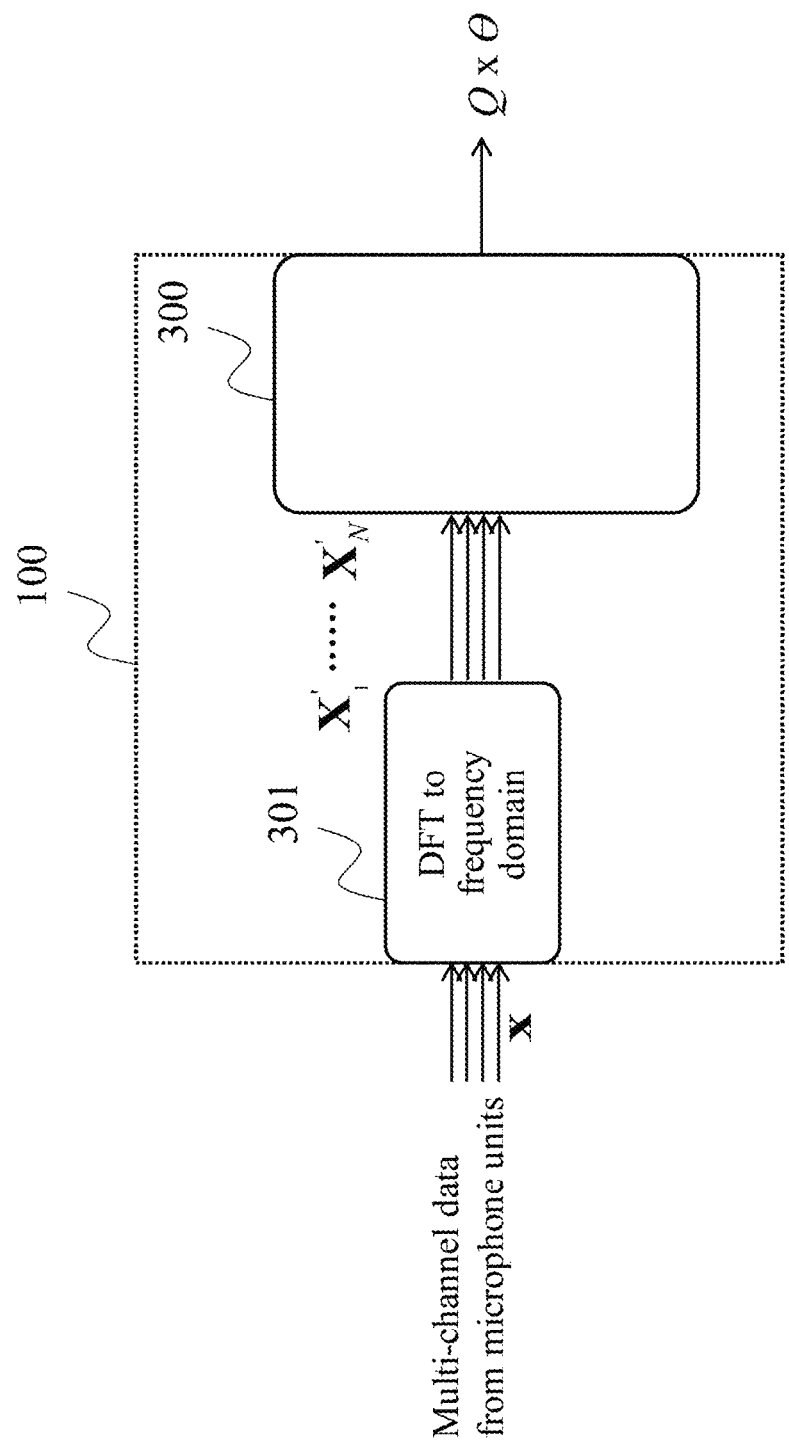
FIG. 3 shows a device according to an embodiment of the disclosure.

An exemplary device 100 according to an embodiment of the disclosure, which builds on the device 100 shown in FIG. 1, is shown in FIG. 3. The multichannel recording signals, i.e. the multi-channel data obtained by the plurality of microphone units 201, are received by the device 100. In the device 100, these signals are transformed e.g. by a transforming unit 301, into the frequency domain (as mentioned a DFT with N points), and then the device 100 applies, e.g. by an estimation unit 300, an estimation algorithm that outputs $Q$ DOAs $\theta$ from these the narrow-band signals.

Figure 4:
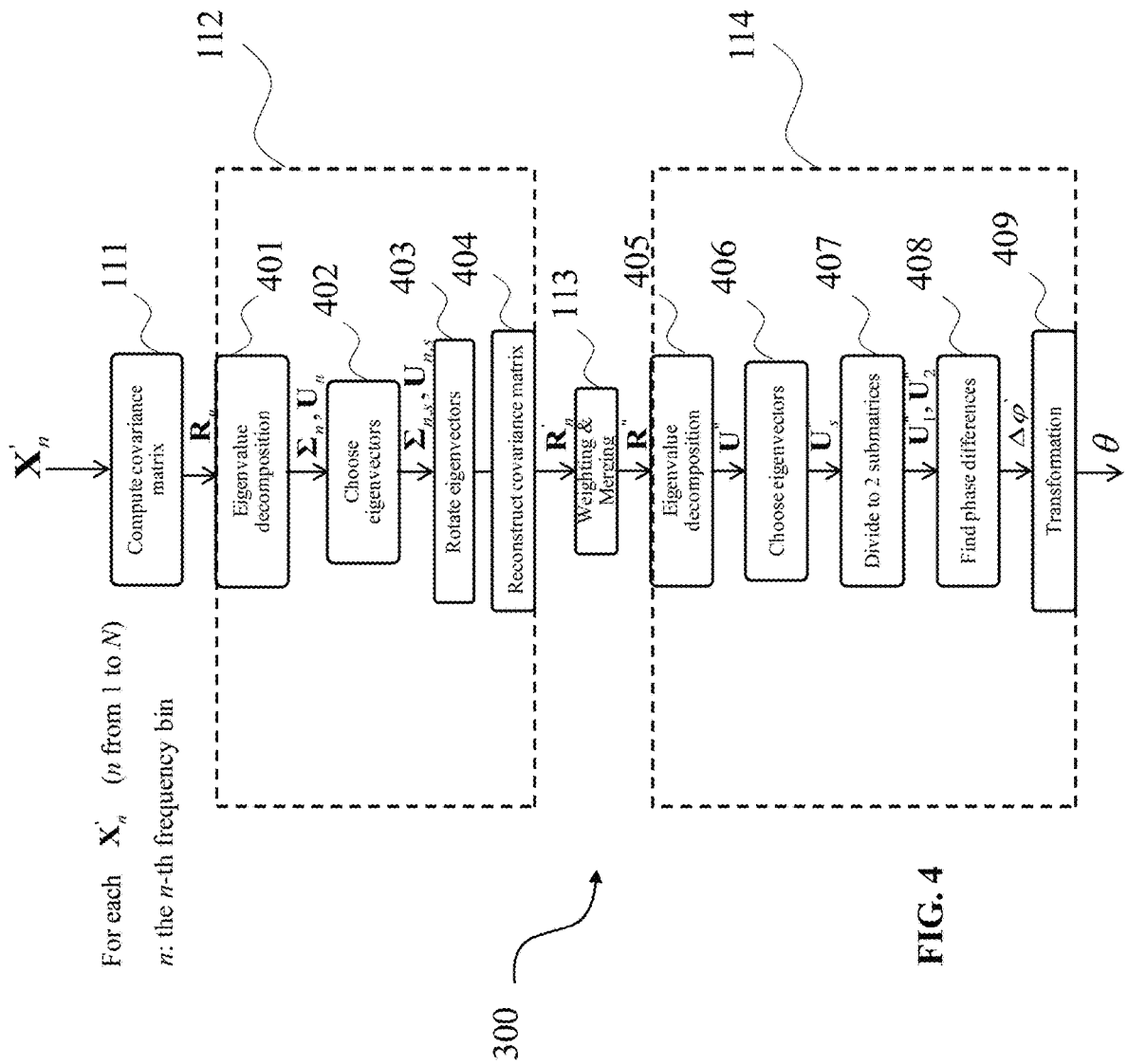
FIG. 4 shows a method according to an embodiment of the disclosure.

Detailed steps carried out in the estimation unit 300 are shown in FIG. 4 and described in the following. The steps are part of a exemplary method 110 according to an embodiment of the disclosure, which builds on the method 110 shown in FIG. 1. The steps shown in FIG. 4 can be categorized as frequency bin wise narrow-band signal processing (step 111 and 112) and wide-band signal processing (step 113 and 114).

The device 100 and method 110 can specifically be considered to implement an improved modification of the ESPRIT algorithm. A short overview of the ESPRIT algorithm is thus given at first.

The ESPRIT algorithm obtains orthogonal signal subspaces by computing eigenvectors of a multichannel covariance matrix for each frequency bin. The signal in the frequency domain is denoted by $X = \{X_1, \ldots X_N\}$.

$$R_n = E\{X_n X_n^*\} \qquad \text{Equation 1}$$

$$R_n U_n = \Sigma_n U_n$$

In Equation 1, $R_n$ denotes the covariance matrix, $E\{*\}$ denotes the expectation process, $U_n$ denotes the eigenvector, and $E_n$ denotes the eigenvalue (diagonal matrix) on the $n_{th}$ frequency bin.

It is here assumed that the lower the eigenvalue, the more diffusive the corresponding eigenvector. Thus, Q eigenvectors may chosen by the largest Q eigenvalues. The eigenvector matrix after selection is then denoted as $U_{n,s}(P \times Q)$, wherein the columns of the eigenvector matrix represent the related pairs of microphone units 201, and the rows of the eigenvector matrix represent the related sound sources 200.

To estimate the phase differences between a microphone unit 201 and its translationally shifted microphone unit 201 each pair, the microphone units 201 may be considered as two subarrays that separate the shifted microphone units (as shown in FIG. 2). In $U_{n,s}$, the matrix is correspondingly separated to two sub-matrices $U_{n,1}$, $U_{n,2}$.

It can accordingly be defined as $$U_{n,1} \stackrel{\Delta}{=} A_{n,1} T_n \qquad \text{Equation 2}$$

$$U_{n,2} \stackrel{\Delta}{=} A_{n,2} T_n = A_{n,1} \Delta \varphi_n T_n$$

In Equations 2, $T_n$ denotes a non-singular matrix at the $n_{th}$ frequency bin.

The relationship of the phase difference between the two frequencies $f_i$, $f_j$ is $$\frac{\Delta \varphi_i}{f_i} = \frac{\Delta \varphi_j}{f_j} \qquad \text{Equation 3}$$

Therefore, the phase differences between the frequencies are different, and that is why the ESPRIT algorithm has to be repeated for each frequency bin to estimate each narrow-band phase difference.

The estimation of $\Delta \varphi_i$ from $U_{n,2}$, $U_{n,2}$ is $$U_1'' = U_2'' \psi \qquad \text{Equation 4}$$

$$\psi = T \Delta \varphi' T^{-1}$$

In the end, the phase difference is transformed to DOA by $$\theta = \arcsin \frac{c \Delta \varphi_n}{2 \pi f_n \Delta d} \qquad \text{Equation 5}$$

Now the improved algorithm implemented by the device 100, realized by performing the method 110, is described. In particular, a uniformed phase difference vector $\Delta \varphi'$ is defined by, $$\Delta \varphi' = \frac{\Delta \varphi}{f} \qquad \text{Equation 6}$$

The uniformed phase difference vectors are theoretically equal for all the frequency bins. Therefore, if the covariance matrices $R_n$ are adapted to $R_n'$ and merged together to obtain an accumulated covariance matrix $R''$, the uniformed phase difference vector $\Delta \varphi'$ can be estimated in wide-band. In this respect, in FIG. 4, like described above for the ESPRIT algorithm, the device 100 is configured to compute 111 a covariance matrix $R_n$, for each $X_n$, with n from 1 to N, wherein n denotes the nth frequency bin. Then, as described above for the ESPRIT algorithm, the device 100 is configured to carry out an eigenvalue decomposition 401 to obtain the eigenvectors $U_n$ and eigenvalues $\Sigma_n$. Each eigenvector $U_n$ is then chosen 402 individually. Preferably, $Q$ eigenvectors $U_n$ of the covariance matrix $R_n$ related to the Q highest eigenvalues $\Sigma_n$ are chosen 402.

By the feature of the steering vector $A_i$, $$\frac{\Delta \varphi_i}{f_i} = \frac{\Delta \varphi_j}{f_j} \rightarrow A_i^{f_i^{-1}} = A_j^{f_j^{-1}} \qquad \text{Equation 7}$$

the device 100 is then configured to rotate 403 the eigenvectors $U_n$, preferably by Hadamard powering of the corresponding frequency to the complex-value eigenvector, wherein the rotated eigenvector $U_{n,s}'$ may be defined by $$U_{n,s}' = U_{n,s}^{f_n^{-1}}, \Sigma_{n,s}' = \Sigma_{n,s}^{f_n^{-1}} \qquad \text{Equation 8}$$

The device 100 is then configured to reconstruct 404 the adapted covariance matrix $R_n'$. That means, each rotated eigenvector $U_{n,s}'$ is constructed 404 back to the shape of the covariance matrix $R_n$ to obtain the adapted covariance matrix $R_n'$. To this end, each rotated eigenvector $U_{n,s}'$, a diagonal matrix of size with the shape of Q*Q, and the inverse $U_{n,s}^{-1}{}''$ of the rotated eigenvector are preferably multiplied. The diagonal matrix may be $\Sigma_{n,s}'$. Thus, the adapted covariance matrix $R_n'$ may, for example, be defined by $$R_n' = U_{n,s}' \Sigma_{n,s}' U_{n,s}^{-1}{}' \qquad \text{Equation 9}$$

The phase differences are now uniformed for all the frequency bins, so that the estimation can be processed in wide-band by merging 113 the $R_{n,s}'$ along frequencies of the N frequency bins. The merging 113 may be performed by the device 100 according to $$R'' = \sum_{n}^{N} \beta_n R_n' \qquad \text{Equation 10}$$

where R" is the accumulated covariance matrix and $\beta_n$ is a weighting function. That is, the device 100 is preferably configured to weigh each adapted covariance matrix $R_n'$. One option of realizing the weighting function $\beta_n$ is to weigh each adapted covariance matrix $R_n'$ based on the mean square $|X_n|^{-2}$ of the frequency-domain transformed output signals of the microphone units 201 for the same frequency bin, which may be represented by $$\beta_n = |X_n|^{-2} \qquad \text{Equation 11}$$

The estimation of $\Delta \varphi'$ from R" is preferably similar to the above-described ESPRIT algorithm, but can be made in wide-band. In particular, preferably an eigenvalue decomposition 405 of the accumulated covariance matrix R" is carried out. Then, each eigenvector U" is chosen 406. A division into two submatrices is then applied 407. Then, the phase differences $\Delta \varphi'$ are found 408. Finally, the phase differences $\Delta \varphi'$ are transformed 409 to the DOAs $\theta$. These steps 405-409 may be carried out as the step 114 by the device 100 according to $$R''U'' = \Sigma'' U'' \qquad \text{Equation 12}$$

$$U'' \rightarrow U''_s$$

$$U''_s \rightarrow U''_1, U''_2$$

$$U''_1 = U''_2 \psi$$

$$\psi = T \Delta \varphi' T^{-1}$$

That is, in order to estimate 114 the DOA for each of the $Q$ sound sources 200, the device 100 is preferably configured to estimate, based on the accumulated covariance matrix R", accordingly adapted phase difference values $\Delta \varphi''$, each of the adapted phase difference values $\Delta \varphi'$ being related to a phase difference $\Delta \varphi'$, between two microphone units 201, and estimate the DOAs $\theta$ based on the adapted phase difference values.

A main difference of the algorithm implemented by the device 100 compared to the ESPRIT algorithm is the DOA estimation 409 in the end, namely $$\theta = \sin^{-1} \frac{2\pi c \arg \Psi}{\Delta d} \qquad \text{Equation 13}$$

It can be seen from Equation 13 that the frequency (f) does not appear in contrast to Equation 5 for the ESPRIT algorithm. That is, the DOA estimation in the end is frequency-independent, and thus for wide-band.

In the following some advantageous modifications of the method 110 carried out by the device 100 are described.

With respect to a first advantageous modification, it may for instance happen that, in order to process $$U_{n,s}^{f_n^{-1}},$$

the device 100 is challenged with accuracy, when the frequencies are too high. When the frequency is getting larger, a higher level of quantization is used to prevent value distortions when representing the numbers in digital. Conventionally, double-precision floating-point format that occupies 8 bytes in computer memory is the highest level of the quantization, but it is still far below the precision requirement. To ensure that a floating-point computation in the device 100 can run accurately, the device 100 may be configured to perform, over all frequency bins, an accumulation iteration process based on the eigenvectors and their related eigenvalues, or a summing process, or an averaging process based on the reconstructed covariance matrices. The accumulation iteration process, for instance, may repeat $$R'''_{n+1} = \beta_{n+1} U_{n+1,s} \Sigma_{n+1,s} U_{n+1,s} + R''_n \qquad \text{Equation 14}$$

$$R'''_{n+1} \overset{def}{=} U'''_{n+1,s} \sum\nolimits'''_{n+1,s} U'''^{-1}_{n+1,s}$$

$$R''_{n+1} = U'''^{f_n^{-1} f_{n+1}}_{n+1,s} \Sigma'''^{f_n^{-1} f_{n+1}}_{n+1,s} U^{-f_n^{-1} f_{n+1}}_{n+1,s}$$

from frequency bin 1 to N-1. Then R"=R$_n$". Equation 13 is accordingly updated to $$\theta = \sin^{-1} \frac{2\pi c f_N \arg \Psi}{\Delta d} \qquad \text{Equation 15}$$

In a second advantageous modification, the device 100 may be configured to accumulate R" along time frames, i.e. to accumulate adapted covariance matrices over a plurality of time frames. This measure will also improve the robustness for short-time stationary source localization. A representation may be $$R''(t) = \alpha R''(t-1) + (1\alpha) R''(t) \qquad \text{Equation 16}$$

R"(t) denotes the accumulated (i.e. adapted wide-band) covariance matrix at the time frame t.

The device 100 may include a processing unit configured to carry out the above described operations. The processing unit may be any kind of programmable or non-programmable hardware (e.g., circuitry) or software, or a combination of hardware and software, that is configured to perform the above-described computations. For example, the processing unit may include a processor and a non-transitory memory carrying executable instructions which when carried out by the processor cause the processor to perform the respective operations.

Embodiments of the present disclosure enhance the robustness, computing speed and accuracy of the sound source localization in real-time. Therefore, it has potential for sound source localization and supporting distance sound pickup purpose for these devices.

The invention has been described in conjunction with various embodiments as examples as well as implementations. However, other variations can be understood and effected by those persons skilled in the art and practicing the claimed invention, from the studies of the drawings, this disclosure and the independent claims. In the claims as well as in the description the word "comprising" does not exclude other elements or steps and the indefinite article "a" or "an" does not exclude a plurality. A single element or other unit may fulfill the functions of several entities or items recited in the claims. The mere fact that certain measures are recited in the mutual different dependent claims does not indicate that a combination of these measures cannot be used in an advantageous implementation.

What is claimed is:

1. A device for estimating a direction of arrival (DOA) of sound from Q sound sources received by P microphone units, wherein P≥Q>1, wherein the microphone units form pairs in which the microphone units have identical sensitivity patterns and are translationally separated by a known and constant displacement vector, the device being configured to:

transform output signals of the P microphone units into a frequency domain and compute N covariance matrices by computing a covariance matrix for each of a plurality of N frequency bins in a range of frequencies of the sound, calculate N adapted covariance matrices for wide-band merging by calculating from each of the N covariance matrices a corresponding adapted covariance matrix of the N adapted covariance matrices, calculate an accumulated covariance matrix from the N adapted covariance matrices, and estimate the DOA for each of the Q sound sources based on the accumulated covariance matrix, wherein the calculation of the corresponding adapted covariance matrix comprises:

spectrally decomposing a corresponding covariance matrix of the N adapted covariance matrices, obtaining a plurality of eigenvectors, rotating each of the obtained eigenvectors by Hadamard powering of a corresponding frequency to a complex-value eigenvector, and constructing each of the rotated eigenvectors back to a shape of the corresponding covariance matrix to obtain the corresponding adapted covariance matrix.

2. The device according to claim 1, wherein, in order to obtain the plurality of eigenvectors, the device is configured to select Q eigenvectors of the corresponding covariance matrix related to Q highest eigenvalues.

3. The device according to claim 1, wherein, in order to construct a rotated eigenvector, of the eigenvectors, back to the shape of the corresponding covariance matrix, the device is configured to reconstruct the corresponding covariance matrix by multiplying the rotated eigenvector, a diagonal matrix of size Q*Q, and an inverse of the rotated eigenvector.

4. The device according to claim 1, wherein, in order to rotate each of the obtained eigenvectors and construct each of the rotated eigenvectors back to the shape of the corresponding covariance matrix, the device is configured to perform, over all of the frequency bins, an accumulation iteration process based on the eigenvectors and the eigenvectors' related eigenvalues, or a summing process, or an averaging process based on reconstructed covariance matrices.

5. The device according to claim 1, wherein, in order to calculate the accumulated covariance matrix, the device is configured to weigh each of the N adapted covariance matrices.

6. The device according to claim 5, wherein the device is configured to weigh each of the adapted covariance matrix, of the adapted covariance matrices, based on a mean square of the frequency-domain transformed output signals of the microphone units for a same one of the frequency bins.

7. The device according to claim 1, wherein, in order to calculate the accumulated covariance matrix, the device is configured to accumulate the N adapted covariance matrices over a plurality of time frames.

8. The device according to claim 1, wherein, in order to estimate the DOA for each of the Q sound sources, the device is configured to estimate, based on the accumulated covariance matrix, accordingly adapted phase difference values, each of the adapted phase difference values being related to a phase difference between two of the microphone units, and estimate the DOAs based on the adapted phase difference values.

9. A method of estimating direction of arrival (DOA) of sound from $Q \geq 1$ sound sources received by P microphone units, wherein $P \geq Q > 1$, wherein the microphone units form pairs in which the microphone units have identical sensitivity patterns and are translationally separated by a known and constant displacement vector, the method comprising:
transforming output signals of the P microphone units into a frequency domain and computing N covariance matrices by computing a covariance matrix for each of a plurality of N frequency bins in a range of frequencies of the sound,
calculating N adapted covariance matrices for wide-band merging by calculating from each of the N covariance matrices a corresponding adapted covariance matrix of the N adapted covariance matrices,
calculating an accumulated covariance matrix from the N adapted covariance matrices, and
estimating the DOA for each of the Q sound sources based on the accumulated covariance matrix,
wherein the calculating of the corresponding adapted covariance matrix comprises:
spectrally decomposing a corresponding covariance matrix of the N adapted covariance matrices, obtaining a plurality of eigenvectors, rotating each of the obtained eigenvectors by Hadamard powering of a corresponding frequency to a complex-value eigenvector, and constructing each of the rotated eigenvectors back to a shape of the corresponding covariance matrix to obtain the corresponding adapted covariance matrix.

10. A non-transitory computer readable medium comprising a program code that is configured to perform the method according to claim 9 upon running on a computer.

* * * * *